May 4, 1954 J. T. TERRY, JR., ET AL 2,677,152
SLABBING OF MICROCRYSTALLINE WAX
Filed Jan. 11, 1952
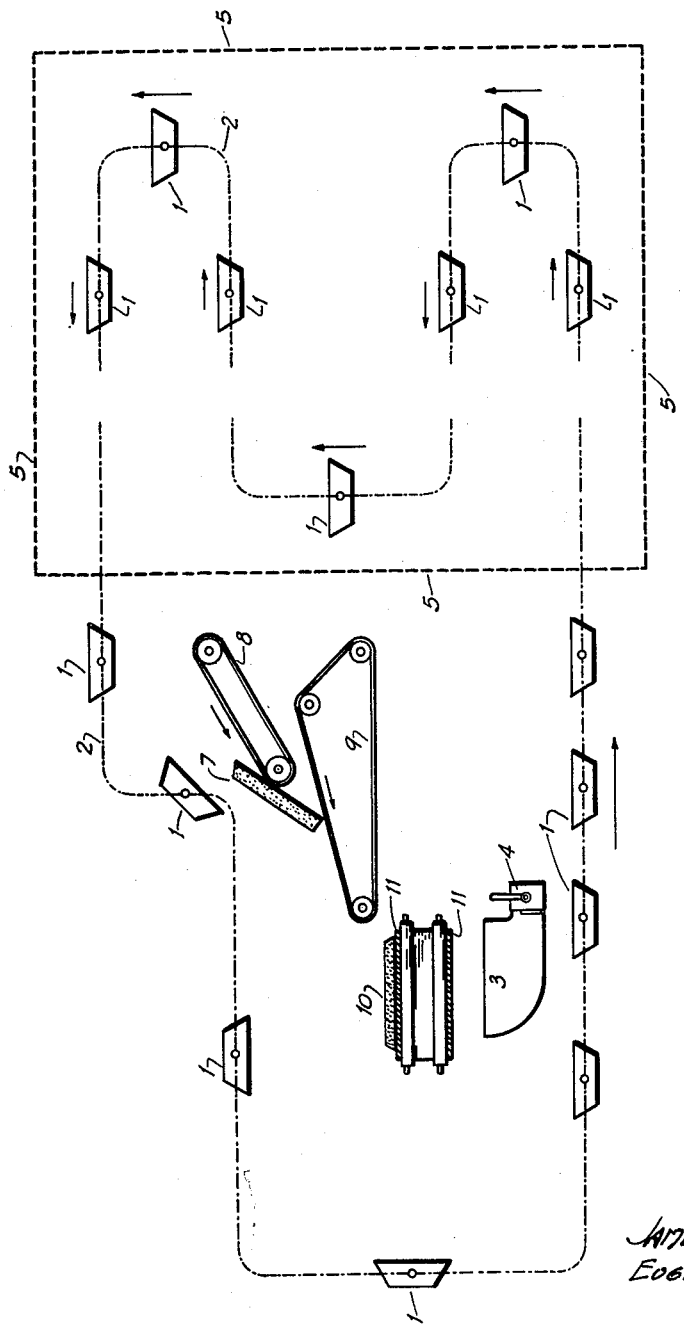
JAMES T. TERRY JR.,
EUGENE J. REEVES
INVENTORS
BY
ATTORNEY Patented May 4, 1954

2,677,152

UNITED STATES PATENT OFFICE 2,677,152

SLABBING OF MICROCRYSTALLINE WAX

Jerome T. Terry, Jr., and Eugene J. Reeves, Beaumont, Tex., assignors to Socony-Vacuum Oil Company, Incorporated, New York, N. Y., a corporation of New York Application January 11, 1952, Serial No. 266,024

5 Claims. (Cl. 18—58)

This invention is directed to a method for the production of microcrystalline waxes in slab form.

One usual form in which microcrystalline wax is prepared for distribution to the trade is in a slab or cake form weighing about eleven pounds, which is about 18½ inches by 11½ inches and about 1½ inches thick.

Usually these cakes or slabs are prepared by a batch method, using an arrangement of alternating open-top molds and internally water-cooled dividers which are assembled upon side-rods and held together by end-pressure on the assembly. The melted wax is poured into the trough formed by the top of the assembly and fills the mold and is cooled therein by water passed through the dividers. After cooling, the wax remaining above the top of the molds is cut or scraped off, the assembly is loosened and the cakes are removed. This method involves a very considerable amount of hand labor and handling of cakes.

There has now been applied to this problem a process of continuous molding in pans adapted from a somewhat analogous industry.

The object of this invention is to provide a proper control for this operation, as will be explained in detail herein.

In order to understand the operation, reference is now made to the drawing which accompanies and is made a part of this specification. This drawing shows, in highly diagrammatic form, the process of slab casting. A series of pans 1, 1, 1, etc., are carried upon a chain 2, 2, 2, etc. These pans are of the proper size for the desired wax slabs, and are closely spaced upon the side chains and arranged in transverse gangs of six pans, side by side. At the left hand end of the lowest pass of the chain, they pass under a depositor, consisting of a hopper 3 and a transverse series of piston type feeders 4, whereby a measured amount of molten wax is withdrawn from hopper 3 and deposited in each pan. Passing to the right, the pans enter into a cooled enclosure designated by dotted lines 5, wherein they are blasted with cooling air to bring about solidification of the wax. The pans are led through a series of horizontal passes in the cooler, (14 passes in one installation), only four being shown in the diagram for purposes of simplicity. The chain and conveyor system is so arranged that the pans remain in an upright and horizontal position, without disturbance of the wax enough to cause distortion of the cake surface, while passing through the cooler. The cooler is fed with cold air, supplied from cooling coils located at one side of the cooler enclosure and blown transversely therethrough.

Emerging from the cooler 5, at the upper left hand end in the diagram, the pans are passed through an upsetting turn and put into an upside down position in the chain pass indicated by 6. This upsetting results in the dropping of the wax slab 7 which through the agency of conveyors 8 and 9, associated with the upsetting or discharge mechanism, is finally placed in position on discharge conveyor 11 by which it is withdrawn laterally from the slabbing machine. The pans are then righted.

The normal operation is to maintain the air temperature and air rate in the cooling chamber and to vary the rate of cooling when necessary by varying the conveyor speed and hence the residence time of the pans within the cooling chamber.

This equipment is essentially the same as is used in slabbing chocolate, etc., and as such forms no part of this invention.

The present requirements for cake wax require careful attention to appearance. The surface of the cake must be clean and free from ripples and bumps and the cake should show no lamination nor broken edges. Even more important, its surfaces should be cleanly formed and as nearly as possible at right angles to each other for economy and ease in packaging. This last requires that the pans be formed with a very minimum of taper or "draft," and gives rise to a problem in cleanly dumping the pans. These and other considerations make it necessary to closely control the operation as to temperature.

The conditions for handling microcrystalline wax in this slabbing machine have been found to be quite different from those useful in handling paraffin wax. Paraffin wax at temperatures not far below its melting point, is a rather brittle solid, not possessed of any surface tackiness. Microcrystalline wax, long known, with some inaccuracy, as "amorphous wax" is a different kind of thing. It was called amorphous because it was not believed to be crystalline. It is now known to be crystalline, but to have extremely small crystal structure compared to paraffin. While it does have a definite melting point, it is plastic for a considerable range below that melting point, plastic at atmospheric temperatures under relatively mild pressure, and quite tacky over a considerable range of temperature. It is these characteristics which give rise to the necessity for handling it in a manner differing from paraffin. If it were handled the same, it could not be dumped from the molding pans to give a clean slab, free from internal defects, and surface defects arising from lack of clean dumping.

The first point of control is in the loading of the pans. With microcrystalline wax the temperature of the wax at loading must be more close to the melting point (ASTM) of the wax than with paraffin. (ASTM melting point is the melting point determined by ASTM Method D 87–42, specified by the American Society for Testing Materials, also designated as ASA Method No. Z 11.4—1942 and API No. 513—1942). Microcrystalline waxes are of higher melting point than paraffin, ranging upward from 155° F., the ASTM melting point of the more common commercial grade being 165° F. We have found that the temperature of loading microcrystalline wax to the pans should not be more than 10 to 15° F. above its ASTM melting point.

The final temperature to which the wax should be cooled is also a matter of importance. It should not only be low enough to permit clean dumping of the wax cake or slab, but since the slab is cooled from the outside and the center of the cake is warmest, the cake or slab should not contain enough residual heat to soften up and lose shape or to "block" (adhere to adjacent slabs when stacked or piled), after removal from the pans. Since the plastic and tacky temperature range of microcrystalline wax is so great, it must be cooled to about 60–75° F., preferably to about 65° F. before dumping. This is the temperature at the center of the cake. This temperature can be taken by inserting thermometers from time to time in individual cakes as a check, but in actual operating practice it is handled by holding the temperature and rate of flow of cooling air constant and controlling the length of time of exposure of the slabs to this cooling.

The rate of cooling is also of importance. Shock chilling is not a factor since we have found that the air may be as cold as practicable, even 5° F., so long as even air flow and exposure of the slabs thereto is provided. In some instances it may be necessary to protect a portion of the cooling cycle, such as the portion found at the lower right hand end of the diagram, from too vigorous air flow. The object is to secure a uniform rate of cooling throughout the entire chain pass. With such uniform cooling, although the center of the slab will of course cool more slowly than the outside, fairly uniform conditions within the slab will be gotten if the time of cooling is proper. This of course depends not so much upon the temperature of the cooling air as it does upon the nature of the wax itself as a heat transfer medium. We have found that for microcrystalline wax slabs of conventional size, cooled from 10–15° F. above their ASTM melting point to 60–70° F. at their center, the time of cooling should be at least 60 to 240 minutes. Expressed in rate, the cooling should be from not less than about ½ to not more than about 2 minutes per degree F.

Another point should also be noted. With paraffin and other materials it is sometimes customary to heat the pan before adding the material to be slabbed. With microcrystalline wax this has been found to be bad practice, leading to poor dumping. Since the pans, when dumped, are quite cold (quite a bit below the 60–70° F. center temperature of the cake), and since they do not warm appreciably during the relatively short pass from dump to load, they are usually about right for the job if heating is omitted. Also, free dumping requires a pan having a relatively high temperature expansion coefficient. The normally used metal pans are satisfactory, but glass, plastics, and the like, or pans lined with such materials, are not recommended.

We claim:

1. In the method of converting microcrystalline wax into clean, microcrystalline wax slabs, substantially free from internal and surface defects, which includes depositing wax in a mold pan, moving the pan through a cooling chamber and discharging a solidified wax slab from the pan, the improvement which comprises loading the wax into the pan at a temperature not more than about 15° F. above its ASTM melting point, cooling the wax slowly to a temperature of 60–70° F. at the center of the slab, and dumping the wax.

2. In the method of converting microcrystalline wax into clean, microcrystalline wax slabs, substantially free from internal and surface defects, which includes depositing wax in a mold pan, moving the pan through a cooling chamber and discharging a solidified wax slab from the pan, the improvement which comprises loading the wax into the pan at a temperature not more than about 15° F. above its ASTM melting point, cooling the wax slowly during a time of from about 60 minutes to about 240 minutes to a temperature of 60–70° F. at the center of the slab, and dumping the wax.

3. In the method of converting microcrystalline wax into clean, microcrystalline wax slabs, substantially free from internal and surface defects, which includes depositing wax in a mold pan, moving the pan through a cooling chamber and discharging a solidified wax slab from the pan, the improvement which comprises loading the wax into the pan at a temperature not more than about 15° F. above its ASTM melting point, cooling the wax slowly at a rate ranging from not less than about ½ minute per degree F. to not more than about 2 minutes per degree F. to a temperature of 60–70° F. at the center of the slab, and dumping the wax.

4. A method as defined in claim 1 wherein a chain of mold pans are conveyed continuously through the wax depositing station, thence through the cooling chamber and thence through the wax dumping station.

5. A method as defined in claim 2 wherein a chain of mold pans are conveyed continuously through the wax depositing station, thence through the cooling chamber and thence through the wax dumping station.

References Cited in the file of this patent

UNITED STATES PATENTS

| Number | Name | Date |
|---|---|---|
| 993,321 | Coddington | May 23, 1911 |
| 1,541,999 | Paley | June 16, 1925 |
| 1,658,062 | Sprague | Feb. 7, 1928 |
| 2,583,938 | French | Jan. 29, 1952 |